March 28, 1961  H. MARKER  2,977,129
CABLE HOLDER FOR SKI-FASTENING CABLES
Filed March 25, 1959
FIG.1.
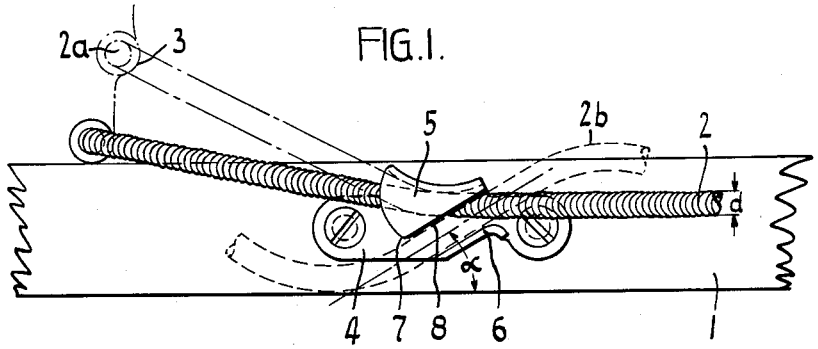
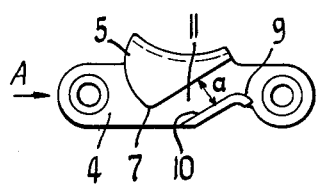
FIG.2.
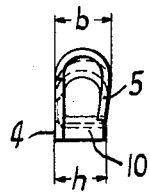
FIG.3.
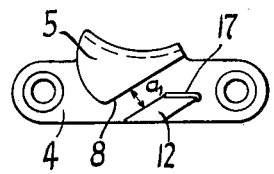
FIG.4.
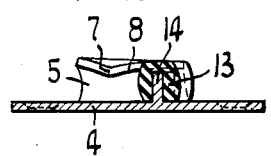
FIG.6.
FIG.7.
FIG.5.
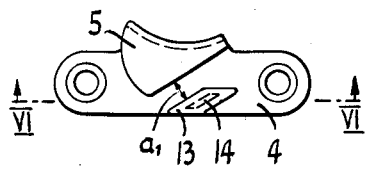
FIG.8.
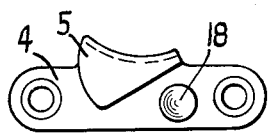
FIG.9.
INVENTOR.
Hannes Marker
BY Michael S. Striker
    Attorney

United States Patent Office 2,977,129
Patented Mar. 28, 1961

2,977,129

CABLE HOLDER FOR SKI-FASTENING CABLES

Hannes Marker, 39 Kleinfeldstrasse, Garmisch-Partenkirchen, Germany

Filed Mar. 25, 1959, Ser. No. 801,862

Claims priority, application Germany Mar. 31, 1958

4 Claims. (Cl. 280—11.35)

The invention relates to a cable holder for ski-fastening cables, which holder comprises a cable guide arch and a holding projection arranged beneath the latter. The purpose of these cable holders is to guide the cable in such a manner that damage thereto is avoided as far as possible. Furthermore, the holding projections provided with such cable holders serve to reduce the danger of accidental sliding of the cable out of the guide arch. The known cable holders are at the present time so constructed that they either permit convenient laying of the cable in the cable guide arch but will not prevent accidental slipping of the cable out of the arch, or alternatively they actually prevent this involuntary release, but in this case the cable can only be inserted in and extracted from the guide arch with difficulty and with effort. It is also to be borne in mind that the fastening cable frequently has to be fitted under unfavourable conditions, i.e. with gloves in a stooping position, etc. The present invention consequently has for its object to provide a cable holder which permits convenient insertion and removal of the cable, but on the other hand so secures the fitted fastening cable that the latter is effectively prevented from accidentally slipping out of the guide arch.

For this purpose, according to the invention, the guide arch extending downwardly to beyond the middle of the base plate comprises a straight edge rising at an acute forward angle from the apex of the guide arch and a holding projection is provided at a distance from this edge corresponding to the diameter of the cable and having a height corresponding to the width of the arch. The holding projection curved at the upper end is advantageously so formed that a surface thereof facing the edge of the guide arch extends parallel to the latter, i.e. forms with the edge a relatively long slot for fitting and detaching the cable.

The details of the invention are more fully explained hereinafter by reference to the drawing, which shows constructional examples.

In the drawing,

Fig. 1 is a side elevation of a cable holder fixed on the ski and having a fastening cable fitted thereto, Fig. 2 is a side elevation of this cable holder, Fig. 3 is a rear elevation of the cable holder, seen in the direction A of Fig. 2, Fig. 4 shows another embodiment of a cable holder, Fig. 5 is a third embodiment of a cable holder, Fig. 6 is a section on the line VI—VI of Fig. 5, Fig. 7 is a view of another embodiment of a cable holder, Figs. 8 and 9 are respectively a bottom plan view and side view of another embodiment of a cable holder.

Fig. 1 of the drawing shows the middle portion 1 of a ski and a fastening cable 2 which, as indicated at 2a in chain-dotted lines, can be placed in the heel welt 3 of a ski boot. This cable is guided and held by means of a cable holder consisting of a base plate 4, a suitably bent cable guide arch 5 and a holding projection 6.

As will be seen from the drawing, the guide arch extends downwardly beyond the middle of the base plate 4 and comprises a straight edge 8 which rises forwardly at an acute angle $\alpha$ from the apex 7. The holding projection 6 is arranged at a distance $a$ corresponding to the cable diameter $d$ (5 mm.), the height $h$ of the projection 6 corresponding to the width $b$ of the guide arch. The distance $a$ is only slightly greater, i.e. by about 0.3 mm., than the cable diameter $d$. With the preferred embodiment shown in Figs. 1 to 3, the holding projection is curved at the upper end at 9 and extends as far as the bottom edge of the base plate 1, and the projection surface 10 which faces the edge 8 of the guide arch extends parallel to the said edge. In this way, a relatively long slot 11 is formed, which is defined by the parts 8 and 9. The insertion as well as the removal of the cable is consequently only possible in the cable position indicated in Fig. 1 at 2b in broken lines. As can be seen from the drawing, the means which have been illustrated and described, i.e. the particular design of the cable holder, will permit convenient insertion and removal of the cable, but on the other hand, an accidental slipping out of the cable from the holder is hardly possible. The angle $\alpha$, at which the hook edge 8 is inclined relatively to the centre line of the base plate or relatively to the horizontal, is about 30–45°, as illustrated in Figs. 1 and 7. With a larger angle $\alpha$, the accidental slipping out of the cable is even more effectively prevented.

The cable holder illustrated can be made of a suitably stamped and bent sheet metal element. Referring to the embodiment shown in Fig. 4, the holding projection 12 consists of a resilient material which is for example applied by the "Metalastik" process or can be connected fixedly to the base plate 1. In this case, the slot width $a1$ can be chosen equal to the cable diameter $d$ or a few tenths of a millimetre smaller, so that it is not possible for the cable to slip out accidentally. If necessary, the resilient projection can be covered on the upper end by a metal plate 17.

In the construction according to Figs. 5 and 6, the holding projection consists of a resilient sheath 13 of rubber or the like, which is fixed on a pin 14 fixedly connected to the base plate 4. The slot width $a1$ is dimensioned in the same relationship to the cable diameter as in the construction according to Fig. 4.

Fig. 7 shows a cable holder with a cable guide arch 5, the straight edge 8 of which rises at a steeper angle $\alpha$ of for example 45°. As shown in Fig. 7, the holding projection 15 can perhaps also be made somewhat shorter, so that it does not extend as far as the bottom edge 16 of the base plate.

Figs. 8 and 9 show yet another constructional form. In this embodiment, a holding projection 18 of rubber or the like without any metal reinforcement is provided, and this projection can be vulcanized directly and flush on the cable holder.

I claim:

1. A cable holder for ski fastening cables having a selected diameter comprising, in combination, an elongated base plate having a top edge and a bottom edge and being adapted to be fixedly attached to a side face of a ski in a direction substantially parallel to longitudinal edges of said side face; a guide arch integral with said base plate and having a guide portion projecting laterally from said top edge of said base plate and a hook portion projecting downwardly from said guide portion spaced from said base plate toward said bottom edge thereof, said hook portion having a free edge extending forwardly and upwardly inclined under an acute angle to said direction; and an elongated holding projection located beneath said free edge and projecting substantially parallel to said free edge from said base plate integral therewith at a distance from said free edge substantially equal to said diameter of said cable, said holding projection having an upper end curved away from said free edge.

2. A cable holder for ski fastening cables having a selected diameter comprising, in combination, an elongated base plate having a top edge and a bottom edge and being adapted to be fixedly attached to a side face of a ski in a direction substantially parallel to longitudinal edges of said side face; a guide arch integral with said base plate and having a guide portion projecting laterally from said top edge of said base plate and a hook portion projecting downwardly from said guide portion spaced from said base plate toward said bottom edge thereof, said hook portion having a free edge extending forwardly and upwardly inclined under an acute angle to said direction; and a holding projection located beneath said free edge and projecting from said base plate integral therewith at a distance from said free edge substantially equal to said diameter of said cable, said holding projection being formed with a covering of elastic material.

3. A cable holder for ski fastening cables having a selected diameter comprising, in combination, an elongated base plate having a top edge and a bottom edge and being adapted to be fixedly attached to a side face of a ski in a direction substantially parallel to longitudinal edges of said side face; a guide arch integral with said base plate and having a guide portion projecting laterally from said top edge of said base plate and a hook portion projecting downwardly from said guide portion spaced from said base plate toward said bottom edge thereof, said hook portion having a free edge extending forwardly and upwardly inclined under an acute angle to said direction; and a holding projection located beneath said free edge and projecting from said base plate at a distance from said free edge substantially equal to said diameter of said cable, said holding projection being formed from elastic material and being fixedly connected to said base plate.

4. A cable-holder for ski fastening cables having a selected diameter comprising, in combination, an elongated base plate having a top edge and a bottom edge and being adapted to be fixedly attached to a side face of a ski; a guide arch integral with said base plate and having a guide portion projecting laterally from said top edge of said base plate and a hook portion projecting downwardly from said guide portion spaced from said base plate toward said bottom edge thereof, said hook portion having a free edge extending forwardly and upwardly inclined under an acute angle to a longitudinal edge of the ski side face; and an elongated holding projection located beneath said free edge and projecting substantially parallel thereto from said base plate integral therewith at a distance from said free edge substantially equal to said diameter of said cable.

References Cited in the file of this patent

UNITED STATES PATENTS

| 1,128,305 | Gammache | Feb. 16, 1915 |

FOREIGN PATENTS

| 756,374 | France | Sept. 18, 1933 |
| 826,982 | France | Jan. 18, 1938 |
| 339,522 | Great Britain | Dec. 11, 1930 |
| 197,319 | Switzerland | July 16, 1938 |